(12) United States Patent
Blanc

(10) Patent No.: US 12,174,428 B2
(45) Date of Patent: Dec. 24, 2024

(54) APPARATUS AND SYSTEM FOR OPTICAL CONNECTOR

(71) Applicant: Nortech Systems, Inc., Maple Grove, MN (US)

(72) Inventor: Scott G. Blanc, Bemidji, MN (US)

(73) Assignee: Nortech Systems, Inc., Maple Grove, MN (US)

( * ) Notice: Subject to any disclaimer, the term of this patent is extended or adjusted under 35 U.S.C. 154(b) by 283 days.

(21) Appl. No.: 17/639,519

(22) PCT Filed: Sep. 4, 2020

(86) PCT No.: PCT/US2020/049471
§ 371 (c)(1),
(2) Date: Mar. 1, 2022

(87) PCT Pub. No.: WO2021/046397
PCT Pub. Date: Mar. 11, 2021

(65) Prior Publication Data
US 2022/0299714 A1  Sep. 22, 2022

Related U.S. Application Data

(60) Provisional application No. 62/896,315, filed on Sep. 5, 2019.

(51) Int. Cl.
G02B 6/38 (2006.01)
(52) U.S. Cl.
CPC ......... *G02B 6/3825* (2013.01); *G02B 6/3817* (2013.01); *G02B 6/3845* (2013.01)

(58) Field of Classification Search
CPC .. G02B 6/3825; G02B 6/3817; G02B 6/3845; G02B 6/32; G02B 6/3831; G02B 6/3854; G02B 6/3878
(Continued)

(56) References Cited

U.S. PATENT DOCUMENTS 7,922,529 B1    4/2011 Meurer
2003/0081386 A1  5/2003 Robillard et al.
(Continued)

FOREIGN PATENT DOCUMENTS

EP    2955555 A1   12/2015

OTHER PUBLICATIONS

International Preliminary Report on Patentability for International Patent Application No. PCT/US2020/049471; dated Dec. 8, 2020; 9 pages.
(Continued)

*Primary Examiner* — John Bedtelyon
(74) *Attorney, Agent, or Firm* — Morgan, Lewis & Bockius LLP

(57) ABSTRACT

An optical connector including: a plug housing having a pin cavity; a pin disposed at least partially in the pin cavity of the plug housing, the pin comprising at least a pin sleeve; a receptacle housing having a socket cavity; a socket disposed at least partially in the socket cavity, the socket comprising at least a socket sleeve; and an alignment sleeve between said pin and socket, wherein the plug housing, the pin, the pin sleeve, the pin ferrule, the receptacle housing, the socket, the socket sleeve, the socket ferrule, and the alignment sleeve: (i) magnetic permeability that is less than 1.0 B/H, where B is magnetic flux density and H is magnetic flux, and (ii) are configured to perform at least 100,000 mating cycles.

7 Claims, 3 Drawing Sheets

(58) Field of Classification Search
USPC .... 385/33, 34, 38, 52, 53, 60–66, 78, 82–84
See application file for complete search history.

(56) References Cited

U.S. PATENT DOCUMENTS

| | | |
|---|---|---|
| 2006/0153489 A1 | 7/2006 | Yang |
| 2007/0126096 A1 | 6/2007 | Fu et al. |
| 2008/0232741 A1 | 9/2008 | Grzegorzewska et al. |
| 2010/0027943 A1 | 2/2010 | Armani et al. |
| 2015/0355418 A1* | 12/2015 | Grinderslev ......... G02B 6/3869 385/61 |
| 2016/0223768 A1* | 8/2016 | Logan, Jr. ............ G02B 6/3871 |
| 2017/0035275 A1 | 2/2017 | Yajima et al. |

OTHER PUBLICATIONS

Extended European Search Report for the European Patent Application No. 20861227.5; dated Aug. 23, 2023; 9 pages.
"We Are Your Special Force Amphenol Defence & Aerospace Core; Edition May 2016", Amphenol Defence & Aerospace, May 1, 2016 (May 1, 2016), pp. 1-164, XP055639412, Saarlouis, Germany Retrieved from the Internet: URL:https://www.amphenol-airlb.de/files/media/pdf/broschueren/Military_Aerospace_Internet.pdf [retrieved on Nov. 6, 2019] * pp. 25-29, 50 * * pp. 147, 148 ** p. 156 *.
International Search Report and Written Opinion for PCT/US/49471 dated Dec. 8, 2020, 11 pages.

* cited by examiner

APPARATUS AND SYSTEM FOR OPTICAL CONNECTOR

CROSS REFERENCE TO RELATED APPLICATIONS

This application is a U.S. National Phase Application of International Application No. PCT/US2020/049471 filed on Sep. 4, 2020, which claims the benefit of U.S. Provisional Patent Application No. 62/896,315 filed Sep. 5, 2019 entitled "Grin Lens Connector", which is incorporated by reference herein in its entirety.

FIELD OF INVENTION

The present invention generally relates to optical connectors and optical connector systems.

BRIEF SUMMARY

In one embodiment, there is an optical connector including: a plug housing having a pin cavity; a pin disposed at least partially in the pin cavity of the plug housing, the pin comprising at least a pin sleeve, said pin sleeve at least partially containing a pin ferrule and a pin lens; a receptacle housing having a socket cavity; a socket disposed at least partially in the socket cavity, the socket comprising at least a socket sleeve, the socket sleeve at least partially containing a socket ferrule and a socket lens; and an alignment sleeve removably couplable between said pin and socket, wherein a pin front portion of said pin sleeve and a socket front portion of said socket sleeve are disposable in said alignment sleeve, wherein the plug housing, the pin, the pin sleeve, the pin ferrule, the receptacle housing, the socket, the socket sleeve, the socket ferrule, and the alignment sleeve: (i) magnetic permeability that is less than 1.0 B/H, where B is magnetic flux density and H is magnetic flux, and (ii) are configured to perform at least 100,000 mating cycles.

BRIEF DESCRIPTION OF THE SEVERAL VIEWS OF THE DRAWINGS

The foregoing summary, as well as the following detailed description of embodiments of the optical connector, will be better understood when read in conjunction with the appended drawings of an exemplary embodiment. It should be understood, however, that the invention is not limited to the precise arrangements and instrumentalities shown.

In the drawings.

DETAILED DESCRIPTION

Figure 1:
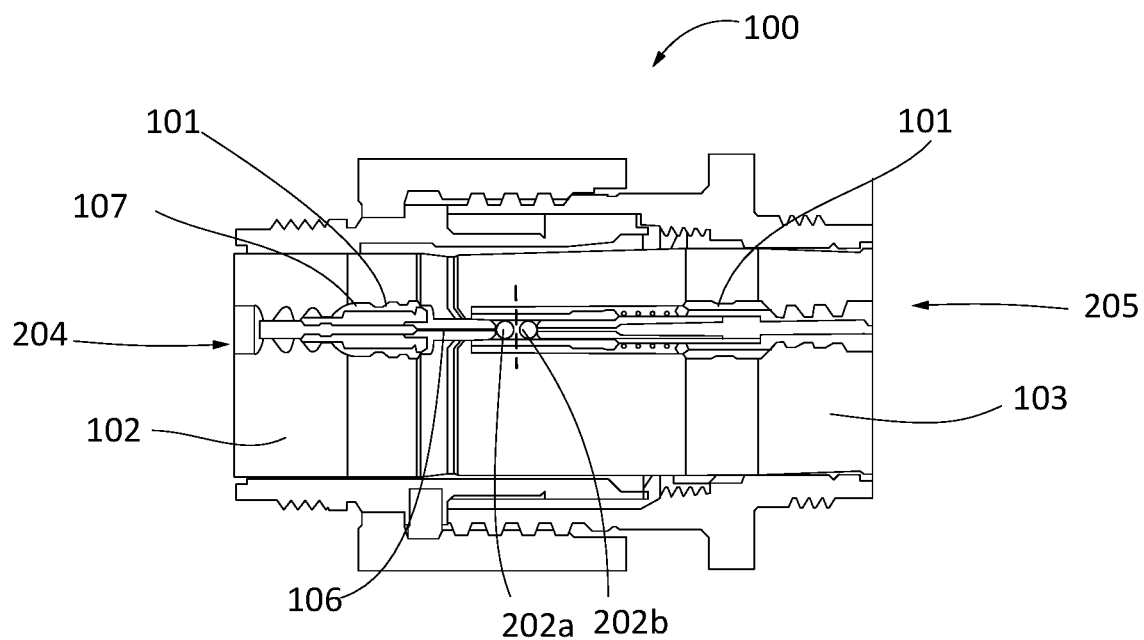
FIG. 1 illustrates an optical connector, in accordance with an exemplary embodiment of the present invention.

Referring to the drawings in detail, wherein like reference numerals indicate like elements throughout, there is shown in FIGS. 1-4 an optical connector 100 and optical connector system 1100, generally designated, in accordance with an exemplary embodiment of the present invention.

In some embodiments, electrical devices are configured to communicate via a fiber-optic communication system. Fiber-optic connectors align pairs of termini (contacts) to facilitate the disconnection and connection of two optical fibers often housed within a cable. The cables may be used to transmit data between two devices. For example, a cable may be used in a magnetic resonance imaging (MRI) machine to transmit the data from the MRI machine to a computer.

The electrical devices may be decouplable from one another, so there is a need for a connector system to connect the fiber-optic lines from each electrical device. Approximately one hundred families of fiber-optic connectors are currently available in the market. Most of these physical contact (PC) connector families use spring-loaded termini to press two fiber end faces together. The end face is the leading edge of an optical fiber that interfaces with air or another optical fiber. Standard PC pairs eliminate the optical energy losses inherent in an air gap between connected ungraded fibers. Precision alignment of mated pairs of termini couples light from one fiber to the other with a minimum reflection of optical energy. Most PCs are polished to achieve a slightly convex surface at the apex of the end face's curvature. The end face apex must be accurately centered on the fiber's core to achieve minimum insertion loss (loss of signal power) and low back reflection (a reversal in the light's direction that reflects optical energy back to its source). Contamination of PC end faces by chips, voids, particles, liquids, etc., jeopardizes and disrupts the fiber cable's signal integrity. Since the physical contact fiber core is exposed whenever the termini are unmated, numerous opportunities exist for end face contamination. Even when mated, PC end faces can be damaged or destroyed by vibrations, mishandling, twisting, poor cleaning procedures, debris, exposure to air or liquid-born contaminants, etc.

By contrast to spring-loaded termini, in some embodiments, where a non-magnetic environment is preferred or even required, embodiments of the connector system may have non-magnetic or reduced magnetic characteristics. Also, in some embodiments, where a connector system is preferred to achieve high mating cycles (as used herein, mating cycles may refer to a number of a times a physical connector can "mate" or connect to its counterpart), the connector system may have ruggedized characteristics such as malleable metals and blind-mating functionality.

Spherical and Graded Refractive Index (GRIN) lenses ("GRIN lenses") provide superior protection for the fiber end faces and improve the signal's transmission integrity by significantly reducing the impact of harsh environmental factors (e.g., external magnetized environments).

GRIN lenses often use expanded-beam (EB) termini to implement ultra-high-bandwidth data connections. Matching GRIN lenses to graded index fibers can significantly reduce the modal dispersion of multimode optical fiber assemblies.

Bonding the flat rear surface of the GRIN lens to polished optical fiber produces collimated light output at the lens's front surface. These GRIN lens flat surfaces may minimize aberrations in imaging applications by delivering low optical insertion loss (attenuation) and reduced reflection losses (power), optimizing the transmission path's backscatter performance. An engineered anti-reflective coating process may be applied to the GRIN lens to the flat end face and minimize insertion loss and signal reflections. Both short-length passive fiber cable assemblies and long-reach active optical cables can successfully employ GRIN lenses to meet the high mating-cycle requirements of swappable interconnection applications.

GRIN lenses may protect the fiber-optic cable cores' exposure to contaminants by bonding them to the back side of each mated pair lens at the lens's focal point. Unlike the convex PC end faces, GRIN lenses are much larger and implemented by using flat surfaces, distributing any accumulated solid or liquid contamination across a surface area fifty to one hundred times greater. By coupling, the GRIN lens's larger signal interface light transmission and reception surfaces are significantly enlarged.

Expanding the light beam and avoiding physical mating contact may enable GRIN lens technology implementations that provide exceptional reliability and optical performance in contaminated environments.

EB GRIN lenses and spherical lenses may reduce the impact of a dust particle from severely data-disruptive to long-term manageable.

When combined with a controlled air gap, extremely high connector mating-cycle capabilities may be achieved, facilitating low-maintenance, long life cycle and robust optical interconnections.

In an example of some of the embodiments, moveable MRI patient handling systems may require ruggedized electro-optical interfaces to connect the MRI imaging components to a system docking station. Replacing high-count legacy radio-frequency (RF) receive image channels with order-of-magnitude-reduced multiplexed fiber-optic channels may significantly improve the system reliability and dramatically increase the equipment's mean time between failures.

Integrating fiber-optic image data channels with ruggedized magnetic resonance coil power-distribution cabling delivers an interconnection system capable of extremely high product lifetime mating cycles. Mixed-mode electro-optical interfaces facilitate engineered solutions that may span a spectrum of custom applications encompassing but not limited to magnetics, vibrations, latching, mating cycles, pneumatics, motion, flexing and field-replaceable maintenance.

A comprehensive medical EB (MEB) solution may need to deliver superior solutions for each of these additional unique MRI technical challenges: world-class optical loss performance, high-energy physics magnetic-field vibrations, both sinusoidal and random low-magnetic components in the scan room, non-magnetic components in the magnet bore rack and panel connector framing with blind-mating and remote-latching capabilities, mixed-mode combinations of RF, optical, power, signal and patient-monitoring technologies, mobile patient-handling docking stations with extremely high mating cycle requirements between the coil sets, patient-handling tables and optical transceivers, field-replaceable components and subsystems, long product life cycle in a moving flex application and dynamic medical regulatory environment.

Incorporating integrated circuits into intelligent cabling may enable application-specific solutions with micro-footprints. Sensors, real-time monitors, read-only memories, transducers, serializers and other higher-level functions may be incorporated into the connector interfaces to meet specific customized system requirements. An intelligent cabling scheme may leverage industrial-grade micro-controllers, embedded devices and local/remote user interfaces to facilitate dynamic system features including auto calibration of test and measurement systems, remote process monitoring/data-logging, system security capabilities, operations-tracking databases and complex system configuration profiles. Ruggedized solutions in mission-critical and regulated environments create knowable/actionable information that may meet current and future safety, security, maintenance and privacy concerns.

Some embodiments may include any mix of the following types of termini and contacts: EB fiber-optic, PC fiber-optic, RF transmit and receive coaxial contacts, signal, power, microphone, headphone, electrocardiograph and specialty patient handling interfaces.

Optical data transmission may virtually eliminate the electromagnetic interference challenges inherent in copper-based RF interconnects which may improve both emissions and susceptibility system performance.

Optical fiber connectors may be a critical part of essentially all optical fiber communication systems. For instance, such connectors are used to join segments of fiber into longer lengths; to connect fiber to active devices such as radiation sources, detectors and repeaters; and to connect fiber to passive devices such as switches, multiplexers, and attenuators. The principal function of an optical fiber connector is to hold the fiber end such that the fiber's core c axially aligned with an optical pathway of the mating structure. This way, light from the fiber is optically coupled to the optical pathway.

Referring to FIG. 1, optical connector 100 may be configured to connect fiber-optic termini from two different external devices (e.g., an MRI machine and a docking station) and transmit data between the two different external devices when in a mated configuration.

Optical connector 100 may include a first connector portion 204 and a second connector portion 205. In some embodiments, the first connector portion 204 may be referred to as a plug, for ease of explanation. In some embodiments, the second connector portion 205 may be referred to as a receptacle, for ease of explanation. First connector portion 204 and second connector portion 205 are configured to be mated together to connect the fiber-optic termini.

Optical connector 100 may include tines 101 each disposed within a plug-housing 102 and a receptacle-housing 103. The tines 101 are configured to hold a fiber-optic line 106 in a static or stationary position while the connector is in use. Optical connector 100 may include pin cavity 107 in the plug-housing 102.

Optical connector 100 may include pin lenses 202a-b. The pin lenses 202a-b may be a spherical ball (SB) or GRIN rod lenses, both leveraging collimated light technology to implement an EB connector. The EB connector may provide superior protection for the fiber end faces and may improve the transmission integrity of the signal by significantly reducing the impact of harsh environmental factors. EB connectors may use two lenses to expand, collimate and refocus the light from the transmitting fiber into the receiving fiber, minimizing optical back reflection. EB systems may rely on the superior performance of non-contacting components to increase the durability of high-speed fiber connections. Bonding polished precision-machined EB lenses to ruggedized fiber-optic cable improves upon conventional data transmission systems such as RF cabling. Engineered anti-reflective coatings may be applied to EB lenses to minimize signal reflections and improve digital data throughput performance.

GRIN lenses may protect the fiber-optic cable cores' exposure to contaminants by bonding them to the back side of each mated pair lens at the lens's focal point. Unlike the convex PC end faces, GRIN lenses may be much larger and implemented by using flat surfaces, distributing any accumulated solid or liquid contamination across a surface area fifty to one hundred times greater. By coupling, the GRIN lens's larger signal interface light transmission and reception surfaces may be significantly enlarged. Expanding the light beam and avoiding physical mating contact may enable GRIN lens technology implementations that provide exceptional reliability and optical performance in contaminated environments. EB GRIN lenses may reduce the impact of a dust particle from severely data-disruptive to long-term manageable. When combined with a controlled air gap, extremely high connector mating-cycle capabilities are achieved, facilitating low-maintenance, long life cycle and robust optical interconnections. Bonding the flat rear surface of the GRIN lens to polished optical fiber produces collimated light output at the lens's front surface. These GRIN lens flat surfaces minimize aberrations in imaging applications by delivering low optical insertion loss (attenuation) and reduced reflection losses (power), optimizing the transmission path's backscatter performance. Both short-length passive fiber cable assemblies and long-reach active optical cables can successfully employ GRIN lenses to meet the high mating-cycle requirements of swappable interconnection applications.

Spherical ball EBs (SBEBs) outperform PC connectors in harsh environments supporting high-speed data links. State-of-the-art springless termini and crimpless cable retention create the optimum optical interface to address the inherent connector misalignments of demanding medical applications. Non-contact air gap technology creates low-wear optical interfaces with significantly reduced connector mating force requirements. Precision manufacturing of SB lenses provides competitively priced interconnects with improved multimode insertion and return-loss performance. Eliminating EB crimp eyelets addresses key Design for Manufacturability production-capability issues.

Contact termination styles include crimp, machined, soldered printed circuit, RF (coaxial, twinax, triax and quadrax) and fiber-optic housed in mated sets of float or hard-mount rack and panel connectors.

Figure 2:
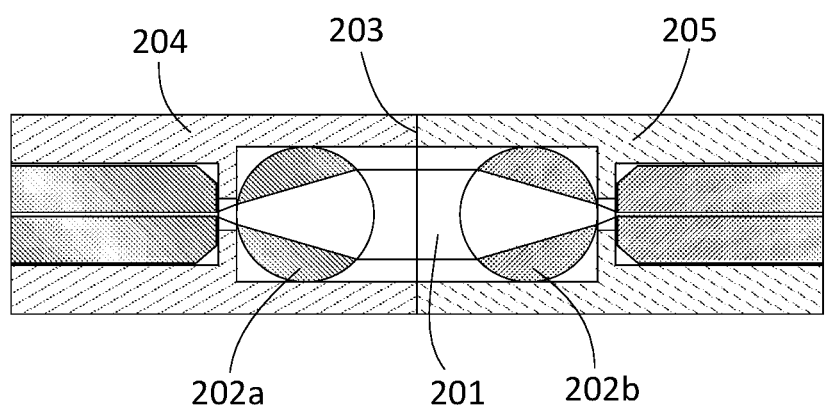
FIG. 2 is a schematic of the concept of beam expansion, in accordance with an exemplary embodiment of the present invention.

Referring to FIG. 2, this figure illustrates the concept of beam using the optical connector 100 of FIG. 1. This design takes advantage of non-contacting optics 202*a-b* (e.g., GRIN lenses, ball lenses) at the interface 203 of two connector portions 204, 205 and the creation of a collimated EB 201 that is transmitted across the interface 203.

Figure 3:
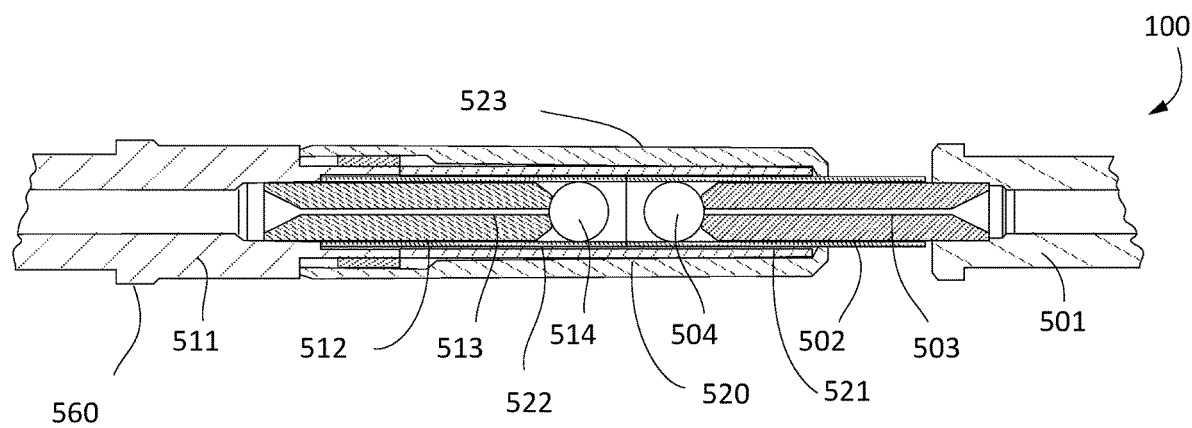
FIG. 3 is the optical connector of FIG. 1 with a shortened socket, in accordance with an exemplary embodiment of the present invention.

Referring to FIG. 3, another schematic representation of the optical connector 100 of FIG. 1 is shown.

The optical connector 100 may comprise various elements described herein, including those shown in FIG. 1, and each of which may be further composed of a base metal layer, subplating metal layer and final plating metal layer. The material of the base metal layer, subplating metal layer and final plating metal layer may be selected from the list comprising or consisting of non-magnetic metals: aluminum, silver, tin, phosphor bronze, brass, copper, gold, lead, titanium, silicon bronze, cobalt-chromium, beryllium copper, non-magnetic stainless steel and various alloy combinations thereof. In one embodiment, one or more of the base metal, subplating and final plating are made of a metal comprising or consisting of aluminum, silver, tin, phosphor bronze, brass, copper, gold, lead, titanium, silicon bronze, cobalt-chromium, beryllium copper, non-magnetic stainless steel and various alloy combinations thereof. In some embodiments, any metal components of the optical connector 100 may have a magnetic permeability that is non-magnetic (e.g., a value of less than 1.0 B/H (or less than about)). As used herein, Magnetic permeability $\mu$ may refer to the degree of magnetization of material in response to a magnetic field. Magnetic permeability may be the ratio of magnetic flux density B and magnetic flux H, such that a value of less than 1.0 is non-magnetic and a value of more than 1.0 is magnetic. The physical constant $\mu_o$ may be the magnetic permeability in vacuum. Relative permeability $\mu r$ may be the ration of $\mu$ and $\mu_o$. It should be noted that plastic materials may not be suitable for MRI applications. If the surface of the MRI is hygroscopic, when the water particles reach higher magnetic fields the particles may cause image artifacts.

For example, the optical connector 100 may comprise a plug-housing 102 having a pin cavity 107 (as shown in FIG. 1). The plug-housing 102 and pin cavity 107 may comprise base metal layer, subplating metal layer and final plating metal layer. The material of the base metal layer, subplating metal layer and final plating metal layer of the plug-housing 102 and pin cavity 107 may include metals having minimal magnetic characteristics, such as metals selected from the list comprising or consisting of aluminum, silver, tin, phosphor bronze, brass, copper, gold, lead, titanium, silicon bronze, cobalt-chromium, beryllium copper, non-magnetic stainless steel and various alloy combinations thereof. In one embodiment, at least partially disposed in the cavity 107 is a pin 501 (see FIG. 3) having a front and a rear. The pin 501 may comprise at least a pin sleeve 502 having a pin sleeve length (PSL). Both the pin 501 and pin sleeve 502 may be further composed of a base metal layer, subplating metal layer and final plating metal layer. The material of the base metal layer, subplating metal layer and final plating metal layer of the pin 501 and pin sleeve 502 may be selected from the list comprising or consisting of aluminum, silver, tin, phosphor bronze, brass, copper, gold, lead, titanium, silicon bronze, cobalt-chromium, beryllium copper, non-magnetic stainless steel and various alloy combinations thereof. The pin sleeve 502 may partially contain a pin ferrule 503 and a pin lens 504. The pin lens 504 may be bonded to a fiber-optic cable, capable of 100,000, 150,000 or 200,000 flex cycles. The fiber optic cable may be have a 2-millimeter (mm) diameter. In one embodiment, the fiber-optic cable may have a diameter range as follows: 1-2 mm, 2-3 mm, 3-4 mm. The end faces of grin or spherical lenses must stay close enough to prevent degradation of optical performance. The core size of the optical fiber may be multi-mode (OM) OM1, OM2, OM3, OM4, OM5, and/or single-mode (OS) OS1 and OS2. In one embodiment, the preferred fiber type is an 850 nm laser-optimized 50 um bend-insensitive multimode graded index for 10 Gb/s applications. In another embodiment, 1300 nm and 1700 nm are also utilized.

The pin ferrule 503 and a pin lens 504 may be further composed of a base metal layer, subplating metal layer and final plating metal layer. The material of the base metal layer, subplating metal layer and final plating metal layer of the pin ferrule 503 and a pin lens 504 may be selected from the list comprising or consisting of aluminum, silver, tin, phosphor bronze, brass, copper, gold, lead, titanium, silicon bronze, cobalt-chromium, beryllium copper, non-magnetic stainless steel and various alloy combinations thereof. In one embodiment, the connector system 500 may also comprise a receptacle-housing 103 having a socket cavity (as shown in FIG. 1). At least partially deposed in the socket cavity may be a socket 511 having a front and rear orientation. The socket 511 may comprise at least a socket sleeve 512 having a socket sleeve length. The socket sleeve may partially contains a socket ferrule 513 and a socket lens 514.

In some embodiments, the socket 511 or any receiving component of the connector system 1100 may have disposed within a cavity of the receiving component a cylinder with several equally spaced longitudinal beams twisted into a hyperbolic shape to form a "basket" for mechanical energy absorption and effectively receiving the pins even after a high number of mating cycles (e.g., 100,000 cycles). The hyperbolic, stamped and formed flat-grid configuration may ensure a large, face-to-face surface area engagement. As the mating pin enters, the cylinder properties may provide robust, high-density contact. In one embodiment, the base metal layer, subplating metal layer and final plating metal layer are likely different from the metal selected for the housing of the termini. The socket 511 may be running through a bending flex, lateral flex or twisting application. The socket geometry described above may be capable of 100,000, 150,000, 200,000, 250,000, 500,000, 1,000,000 mating cycles. In one embodiment, the socket geometry described above may be capable of greater than 100,000 mating cycles.

An alignment sleeve 520 may be positioned between the pin and socket and retained within the socket shroud 523, wherein a pin front portion 521 of the pin sleeve and a socket front portion 522 of the socket sleeve are disposed in the alignment sleeve 520. The alignment sleeve 520 may comprise a base metal, subplating and final plating. Each of the three components may be selected from the list comprising or consisting of aluminum, silver, tin, phosphor bronze, brass, copper, gold, lead, titanium, silicon bronze, cobalt-chromium, beryllium copper, non-magnetic stainless steel and various alloy combinations thereof. In one embodiment, one or more of the base metal, subplating and final plating are made of metals comprising or consisting of aluminum, silver, tin, phosphor bronze, brass, copper, gold, lead, titanium, silicon bronze, cobalt-chromium, beryllium copper, non-magnetic stainless steel and various alloy combinations thereof. These characteristics of the alignment sleeve 520 may ensure at least 100,000 mating cycles.

Latch 560 shown in FIG. 3 is also composed of a base metal layer, subplating metal layer and final plating metal layer. The material of the base metal layer, subplating metal layer and final plating metal layer may be selected from the list comprising or consisting of aluminum, silver, tin, phosphor bronze, brass, copper, gold, lead, titanium, silicon bronze, cobalt-chromium, beryllium copper, non-magnetic stainless steel and various alloy combinations thereof. In one embodiment, one or more of the base metal, subplating and final plating are made of metals comprising or consisting of aluminum, silver, tin, phosphor bronze, brass, copper, gold, lead, titanium, silicon bronze, cobalt-chromium, beryllium copper, non-magnetic stainless steel and various alloy combinations thereof.

Embodiments of the optical connector 100 have a number of significant advantages. For example, due to the non-contact design, no noticeable optical performance degradation occurs at the EB optical interfaces. This means that while the PC version will begin its performance degradation from essentially the time it has been polished and left the factory, the non-contact EB design does not experience any optical signal degradation during its lifetime. Furthermore, due to the beam expansion, the presence of dust particles in the EB environment has a much lesser effect on performance than it has for the PC environment, with the result that the EB design is increasingly becoming the preferred optical terminus to use in harsh environments. Also, by utilizing metallic components that are less susceptible to magnetic fields, embodiments of the optical connector 100 can be utilized in high magnetic-field environments such as those generated by MRI machines.

Figure 4:
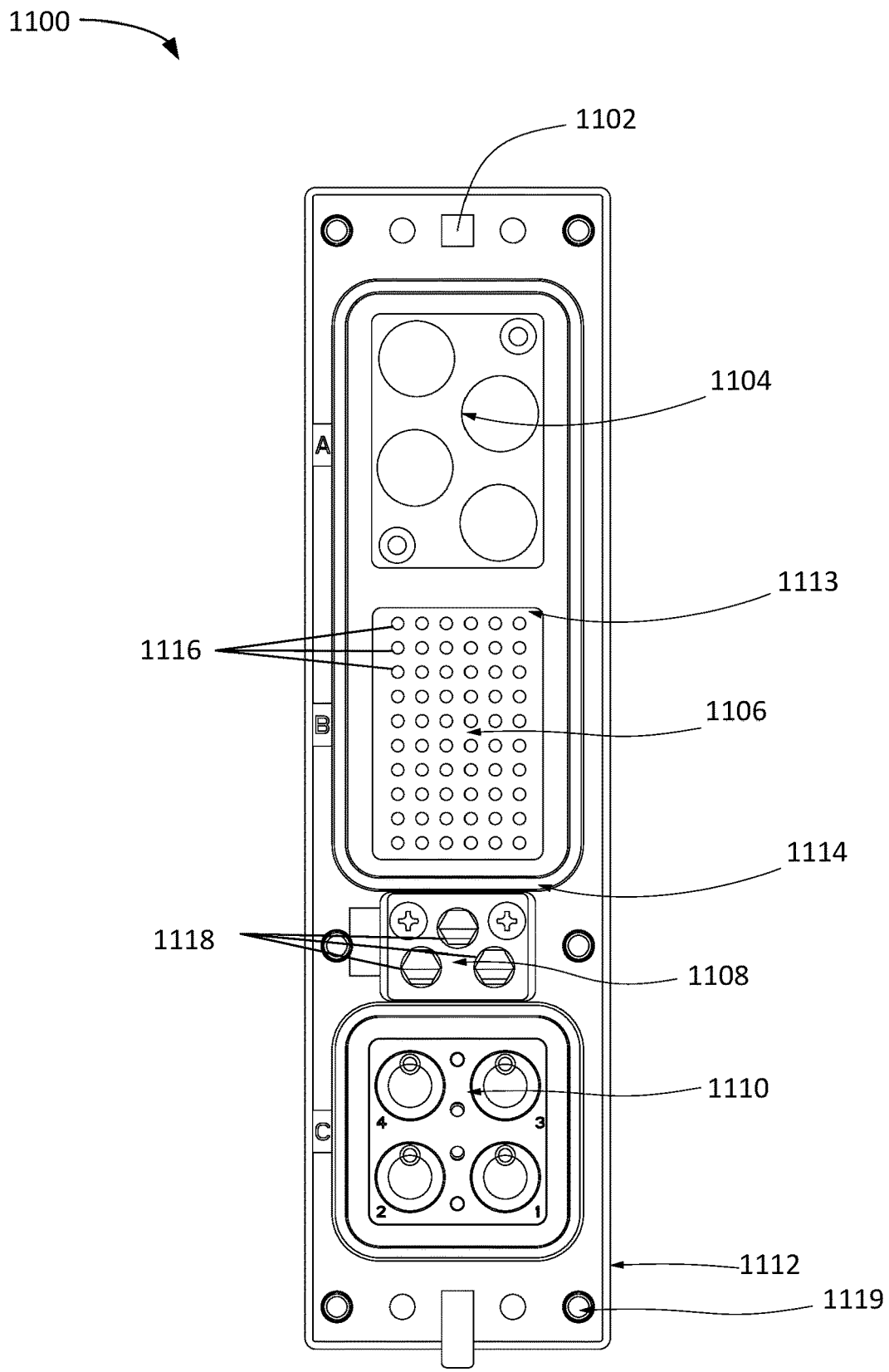
FIG. 4 is a front view of a connector system, in accordance with an exemplary embodiment of the present invention.

Referring to FIG. 4, there is a front view of a first portion of a connector system 1100, in accordance with an exemplary embodiment of the present invention. In some embodiments, a second portion of the connector system 1100 may mate with the first portion of the connector system 1100 to connect the termini between external devices. In some embodiments, the first and second portions of the connector system 1100 may blind-mate.

In some embodiments, the connector system 1100 may include a multi-cavity connector component. Such multi-cavity connector components may comprise an outer housing defining a plurality of cavities for holding inner assemblies or "insert," or, more specifically, pin insert and socket insert for receiving pin or socket termini. Over the years, multi-cavity connectors have evolved into a ruggedized connector system comprising an outer housing, which is configured to mate with the outer housing of a mating connector, typically through a screw connection.

The connector system 1100 may include connector housing 1112. Connector housing 1112 may be configured to receive and/or house one or more insert and transmission lines. The connector housing 1112 may be configured to receive (i) mixed-mode function insert 1104 (also referred to herein as a mixed-mode electrical component), (ii) a plurality of power and signal pin connector insert 1106, (iii) keying and polarizing components insert 1108, (iv) EB fiber-optic lenses insert 1110 (also referred to herein as a EB fiber-optical connector component insert) and/or (v) fixed or floating bushings mounting hardware 1119. The EMI shielded rack and panel frame 1102, mixed-mode function insert 1104, plurality of power and signal pin connector insert 1106, keying and polarizing components insert 1108, EB fiber-optic lenses insert 1110 and fixed or floating bushings mounting hardware 1119 may each comprise a base metal layer, subplating metal layer and final plating metal layer. The material of the base metal layer, subplating metal layer and final plating metal layer may be selected from the list comprising or consisting of aluminum, silver, tin, phosphor bronze, brass, copper, gold, lead, titanium, silicon bronze, cobalt-chromium, beryllium copper, non-magnetic stainless steel and various alloy combinations thereof. In one embodiment, one or more of the base metal, subplating and final plating are made of a metal comprising or consisting of aluminum, silver, tin, phosphor bronze, brass, copper, gold, lead, titanium, silicon bronze, cobalt-chromium, beryllium copper, non-magnetic stainless steel and various alloy combinations thereof. In one embodiment, the fiber-optic lenses insert 1110 may be zirconium or ceramic, precision machined with tight tolerance.

The periphery of the power and signal pin connector insert 1106 and keying and polarizing components insert 1108 may be surrounded by a EMI shielded rack and panel frame 1102. In one embodiment, the power and signal pin connector insert 1106 and keying and polarizing components insert 1108 are integrally formed with the frame 1102. For example, the power and signal pin connector insert 1106, keying and polarizing components insert 1108, and frame 1102 may be molded as a single piece or multiple components of dielectric material.

In one embodiment, the power and signal pin connector insert 1106, keying and polarizing components insert 1108, and frame 1102 are molded from a composite plastic material. For example, the connector housing 1112 may be formed so that two or more of the power and signal pin connector insert 1106, the keying and polarizing components insert 1108 and the frame 1102 are homogeneously formed with one another as a unitary body.

In another embodiment, a different number of the power and signal pin connector insert 1106 are included in one or more of the power and signal insert recesses 1113. Each of the power and signal pin connector insert 1106 may be held in each of a plurality of power and signal insert recesses 1113. The power and signal insert recesses 1113 are surrounded by the frame 1102 and another dividing wall 1114. The dividing wall 1114 may extend from and be integrally formed with the frame 1102. For example, the dividing wall 1114 and the frame 1102 may be homogeneously formed with one another. In another embodiment, a greater number of power and signal insert recesses 1113.

The power and signal pin connector insert 1106 include a plurality of cavities 1116. The cavities 1116 are configured to receive a plurality of electrical contacts (not shown). The electrical contacts held by the power and signal pin connector insert 1106 may be mounted to a circuit board (not shown) by inserting the connector housing 1112 into an opening (not shown) in a panel (not shown) and mounting the electrical contacts onto the circuit board. One or more electrical connectors (not shown) may mate with the electrical contacts held by the power and signal pin connector insert 1106 by mating the electrical connectors with the electrical contacts.

In one embodiment, the power and signal pin connector insert 1106 may hold electrical contacts (not shown) that are used to communicate power between electrical devices. For example, the power and signal pin connector insert 1106 may hold a plurality of posted contacts or the electrical contacts that are mounted on a circuit board and that mate with electrical connectors (not shown) of the peripheral device. In another embodiment, the power and signal pin connector insert 1106 may hold crimp contacts (not shown) that are used to communicate power between the peripheral device and a circuit board or another peripheral device. For example, a crimped cable (not shown) may be electrically connected to the crimp contacts held by one or more of the power connector insert. The crimp cable may then communicate power between one peripheral device electrically connected to the crimp contacts and another peripheral device electrically connected to the crimp cable. In other embodiments, the power and signal pin connector insert 1106 may hold electrical contacts that are used to communicate an electronic data signal between the peripheral device(s) and the circuit board.

The keying and polarizing components insert 1108 includes a plurality of key holes 1118. In one embodiment, the key holes 1118 receive one or more alignment features (not shown) that extend upward from a device (not shown) or circuit board (not shown) with which the connector housing 1112 may be mated. For example, the key holes 1118 may receive alignment pins (not shown) that extend upward from the device with which the connector housing 1112 may be mated. The orientation of the alignment pins and the key holes 1118 may assist in orienting the connector housing 1100. The connector housing 1112 may be oriented by the keying and polarizing components insert 1108 to ensure that the electrical contacts in the power and signal pin connector insert 1106 are properly aligned and oriented with respect to a mating connector (not shown). The key holes 1118 may be provided as part of the mold tooling used to create the shell 160. For example, the key holes 1118 may be formed when the connector housing 1112 is molded, without requiring the use of additional tools or pieces to create the key holes 1118 once the connector housing 1112 may be molded. For example, by providing the key holes 1118 when the shell 160 may be molded, the orientation of the key holes 1118 may be set within a hex cavity.

The power and signal pin connector insert 1106 may be homogeneously formed as a unitary body with the shell 160. For example, the power and signal pin connector insert 1106 may be molded along with the connector housing 1112 from a dielectric material.

Alternatively, one or more of the power and signal pin connector insert 1106 may be separately formed from the shell 160 and later coupled to the shell 160. For example, one or more of the power and signal pin connector insert 1106 may be separately formed from the shell 160 and fixed to the shell 160 by an adhesive, mechanical connection, and the like. In another embodiment, one or more of the power and signal pin connector insert 1106 are divided into at least two components. For example, the power and signal pin connector insert 1106 may include front and rear sections. The rear section of a power and signal pin connector insert 1106 may be homogeneously formed as a unitary body with the connector housing 1112.

In some embodiments, at least some metallic components may be non-magnetic or minimally magnetic to be utilized with electrical systems that generate strong magnetic fields, such as MRI machines. In some embodiments, at least some metallic components may be sufficiently malleable to achieve 100,000 mating cycles, such as in applications related to MRI machines.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention, and various features of the disclosed embodiments may be combined. Unless specifically set forth herein, the terms "a," "an" and "the" are not limited to one element but instead should be read as meaning "at least one." As used herein, the terms "about" and "approximately" may refer to + or −10% of the value referenced. For example, "about 9" is understood to encompass 8.2 and 9.9.

It is to be understood that at least some of the figures and descriptions of the invention have been simplified to focus on elements that are relevant for a clear understanding of the invention while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

What is claimed is:

1. A first optical connector system configured to couple to a second optical connector system, the first optical connector system comprising:
  a connector system housing, the connector system housing being configured to shield internal components from external and internal electro-magnetic interference;
  a mixed-mode electrical component insert disposed in the connector system housing and configured to receive a first set of mixed-mode electrical lines and couple the first set of mixed-mode electrical lines to a second set of mixed-mode electrical lines disposed in the second optical connector system;
  a control signal component insert disposed in the connector system housing and configured to receive a first set of control signal lines and couple the first set of control signal lines to a second set of control signal lines disposed in the second optical connector system; and
  an expanded beam (EB) fiber-optical connector component insert disposed in the connector system housing and configured to receive a first portion of an optical connector and couple the first portion of the optical connector to a second portion of the optical connector,
  wherein the connector system housing, the mixed-mode electrical component insert, the control signal component insert, and the EB fiber-optical connector component:
    (i) have a magnetic permeability that is less than 1.0 B/H, where B is magnetic flux density and H is magnetic flux, and
    (ii) are configured to perform at least 100,000 mating cycles,
  wherein the first portion of the optical connector includes:
    a plug housing having a pin cavity;
    a pin disposed at least partially in the pin cavity of the plug housing, the pin comprising at least a pin sleeve, said pin sleeve at least partially containing a pin ferrule and a pin lens;
    a receptacle housing having a socket cavity:
    a socket disposed at least partially in the socket cavity, the socket comprising at least a socket sleeve, the socket sleeve at least partially containing a socket ferrule and a socket lens; and
    an alignment sleeve removably couplable between said pin and socket, wherein a pin front portion of said pin sleeve and a socket front portion of said socket sleeve are disposable in said alignment sleeve,
    wherein the plug housing, the pin, the pin sleeve, the pin ferrule, the receptacle housing, the socket, the socket sleeve, the socket ferrule, and the alignment sleeve:
      (i) have a magnetic permeability that is less than 1.0 B/H, where B is magnetic flux density and H is magnetic flux, and
      (ii) are configured to perform at least 100,000 mating cycles.

2. The optical connector of claim 1, wherein the plug housing, the pin, the pin sleeve, the pin ferrule, the receptacle housing, the socket, the socket sleeve, the socket ferrule, and the alignment sleeve include a metal component selected from the group consisting of aluminum, silver, tin, phosphor bronze, brass, copper, gold, lead, titanium, silicon bronze, cobalt-chromium, beryllium copper, non-magnetic stainless steel and various alloy combinations thereof.

3. The optical connector of claim 1, wherein the metal component includes a base metal, subplating, and final plating, each selected from the group consisting of aluminum, silver, tin, phosphor bronze, brass, copper, gold, lead, titanium, silicon bronze, cobalt-chromium, beryllium copper, non-magnetic stainless steel and various alloy combinations thereof.

4. The optical connector of claim 1,
  wherein the plug housing, the pin, the pin sleeve, and the pin ferrule include a first metal component selected from the group consisting of aluminum, silver, tin, phosphor bronze, brass, copper, gold, lead, titanium, silicon bronze, cobalt-chromium, beryllium copper, non-magnetic stainless steel and various alloy combinations thereof,
  wherein the receptacle housing, the socket, the socket sleeve, and the socket ferrule include a second metal component selected from the group consisting of aluminum, silver, tin, phosphor bronze, brass, copper, gold, lead, titanium, silicon bronze, cobalt-chromium, beryllium copper, non-magnetic stainless steel and various alloy combinations thereof, and
  wherein the second metal component is separate and distinct from the first metal component.

5. The first optical connector system of claim 1, wherein a metal portion of the optical connector having greater malleability than metal portions of the connector system housing.

6. The first optical connector system of claim 1, wherein the connector system housing, the mixed-mode electrical component insert, the control signal component insert, the keying and polarizing component insert, and the EB fiber-optical connector component each includes a base metal, subplating, and final plating, each selected from the group consisting of aluminum, silver, tin, phosphor bronze, brass, copper, gold, lead, titanium, silicon bronze, cobalt-chromium, beryllium copper, non-magnetic stainless steel and various alloy combinations thereof.

7. A first optical connector system configured to couple to a second optical connector system, the first optical connector system comprising:
  a connector system housing, the connector system housing being configured to shield internal components from external electro-magnetic interference;
  a mixed-mode electrical component insert disposed in the connector system housing and configured to receive a first set of mixed-mode electrical lines and couple the first set of mixed-mode electrical lines to a second set of mixed-mode electrical lines disposed in the second optical connector system;
  a control signal component insert disposed in the connector system housing and configured to receive a first set of control signal lines and couple the first set of control signal lines to a second set of control signal lines disposed in the second optical connector system; and
  an EB fiber-optical connector component insert disposed in the connector system housing and configured to receive a first portion of an optical connector and couple the first portion of the optical connector to a second portion of the optical connector,
  wherein the optical connector includes:
    a plug housing having a pin cavity;
    a pin disposed at least partially in the pin cavity of the plug housing, the pin comprising at least a pin sleeve, said pin sleeve at least partially containing a pin ferrule and a pin lens;
    a receptacle housing having a socket cavity;
    a socket disposed at least partially in the socket cavity, the socket comprising at least a socket sleeve, the socket sleeve at least partially containing a socket ferrule and a socket lens; and an alignment sleeve removably couplable between said pin and socket, wherein, a pin front portion of said pin sleeve and a socket front portion of said socket sleeve are disposable in said alignment sleeve, wherein the plug housing, the pin, the pin sleeve, the pin ferrule, the receptacle housing, the socket, the socket sleeve, the socket ferrule, and the alignment sleeve:
  (i) have a magnetic permeability that is less than 1.0 B/H, where B is magnetic flux density and H is magnetic flux, and
  (ii) are configured to perform at least 100,000 mating cycles, and wherein the connector system housing, the mixed-mode electrical component insert, the control signal component insert, and the EB fiber-optical connector component:
  (i) have a magnetic permeability that is less than 1.0 B/H, where B is magnetic flux density and H is magnetic flux, and
  (ii) are configured to perform at least 100,000 mating cycles.

\* \* \* \* \*